INVENTORS
WILLIAM FONDILLER
LAWRENCE H. O'NEILL
ROBERT FELDSTEIN
Amster & Rothstein
ATTORNEYS

TIME SERVICE SYSTEM

Filed Nov. 19, 1968

INVENTORS
WILLIAM FONDILLER
LAWRENCE H. O'NEILL
ROBERT FELDSTEIN
Amster & Rothstein
ATTORNEYS

INVENTORS
WILLIAM FONDILLER
LAWRENCE H. O'NEILL
ROBERT FELDSTEIN

Amster & Rothstein
ATTORNEYS

INVENTORS
WILLIAM FONDILLER
LAWRENCE H. O'NEILL
ROBERT FELDSTEIN
Amster & Rothstein
ATTORNEYS United States Patent Office 3,626,687

Patented Dec. 14, 1971

3,626,687
TIME SERVICE SYSTEM

William Fondiller, Lawrence H. O'Neill, and Robert S. Feldstein, New York, N.Y. assignors to Time Control Corporation, New York, N.Y.

Filed Nov. 19, 1968, Ser. No. 777,126
Int. Cl. G04c *13/02*
U.S. Cl. 58—24 R 42 Claims

ABSTRACT OF THE DISCLOSURE

A time service system utilizing a single master signal generator and the telephone facility. Dedicated lines are used for transmitting continuous signals from the master generator to individual amplifiers in different buildings. Except for five seconds every twelve hours, a 50-Hz. signal is transmitted to each building amplifier. The amplifier processes the signal and transmits it to numerous clocks in the building which are driven synchronously. At the end of each 12-hour period, a 100-Hz. signal is transmitted by the master generator instead of a 50-Hz. signal for five seconds. With the change in frequency, the clocks automatically reset to a position indicating the exact time when 50-Hz. signal transmission resumes. Thereafter, the clocks are again driven in synchronism with the 50-Hz. signal. Changes to and from daylight saving time are accomplished automatically at the master generator by advancing or delaying the switch-over from 50-Hz. to 100-Hz. transmission by one hour, twice each year.

This invention relates to time service systems, and more particularly to such systems in which electronic control of clock time is automatic and highly accurate.

A number of clock systems are presently in use for controlling a plurality of clocks in accordance with the operation of a master clock. Typically, in these systems a signal is transmitted periodically from a master clock to all of the "slave" clocks for the purpose of synchronizing the latter. If the slave clocks have slowed down or speeded up since the last synchronizing signal, they are reset to the time represented by the master clock. One of the major difficulties with such clock systems is that the slave clocks, particularly toward the end of each operating period, may be very inaccurate.

It is the general object of this invention to provide a clock system in which a plurality of individual clocks are continuously under the control of a single master frequency standard.

It is another object of this invention to provide a clock system in which the individual clocks are synchronized periodically (once every 12 hours in the illustrative embodiments of the invention) for verification purposes.

It is another object of this invention to provide a clock system in which the individual clocks can be stepped forward or backward automatically by one hour twice each year as a result of changes to or from daylight saving time.

It is another object of this invention, in the case of a break in the transmission from the master frequency standard, to protect the time service from interruption by automatic switching to a local frequency source.

It is another object of this invention to provide a time service system which utilizes dedicated channels of a common utility network, and more particularly dedicated lines in the telephone facility.

Briefly, in accordance with the illustrative embodiments of the invention, a master frequency standard is provided at a central station. The central station transmits an accurate 50-Hz. signal over dedicated channels (telephone lines) to individual buildings. (In time division multiplex systems, dedicated time slots can be used instead of dedicated lines. Alternatively, a dedicated radio carrier frequency could be employed for this purpose. All public telecommunication facilities, both analog and digital, and both wire and radio, can be utilized in our invention.) Every twelve hours, starting at a preselected time of day and for five seconds thereafter (a negligible fraction of each 12-hour period), the central station ceases to transmit the 50-Hz. signal and transmits a 100-Hz. signal instead.

Each building in which time service is required is provided with an amplifier whose input is coupled to the dedicated line and whose output is extended to all of the clocks distributed throughout the building. The clocks may be of the type disclosed in A. W. Haydon Pat. No. 3,233,400, issued Feb. 8, 1966, although other types of clocks could be used. The output of the building amplifier is a 50-Hz. signal, preferably square wave for increased efficiency, which drives the clocks synchronously. Thus, the clocks are all driven in synchronism with the master oscillator at the central station.

The clocks are of the type which, in the absence of a drive signal, automatically reset to a preselected time of day—the synchronization time. The master station ceases to transmit a 50-Hz. signal and begins transmission of a 100-Hz. signal five seconds before this synchronization time. Each building amplifier, upon detection of the 100-Hz. signal, ceases transmission of a 50-Hz. signal to the associated clocks. Consequently, all of the clocks reset to the preselected time (although the resetting actually occurs a few seconds before this exact time). When the central station resumes 50-Hz. signal transmission at the preselected time, all of the building amplifiers resume driving the now synchronized clocks.

Each building amplifier is also provided with a local oscillator. In the event signal transmission from the central station over the telephone facility is interrupted due to line failure, the local oscillator in each building amplifier runs freely and drives the clocks in the building. Upon resumption of the 50-Hz. central signal transmission, the building amplifiers once again become locked to the frequency of the master station.

The advatages of our time service system are manifold. The individual clocks are not simply synchronized periodically and then left to run on a power supply of uncertain or variable frequency. Instead, they are continuously controlled by a highly accurate signal from a central station. The 12-hour periodic synchronization further insures the accuracy of the individual clocks. In the event of a failure in the signal from the central station the clocks nevertheless continue to run under control of the 50-Hz. oscillator in the building amplifier. The use of a public utility network such as the telephone system allows the provision of a single highly accurate master frequency standard for all clocks, rather than a master clock in each building. Of particular importance is the fact that seasonal time changes can be controlled remotely and automatically for all clocks simply by advancing or delaying by one hour the changeover from 50-Hz. to 100-Hz. signal transmission from the central station.

Further objects, features and advantages of the invention will become apparent upon consideration of the following detailed description in conjunction with the drawing, in which.

Figure 1:
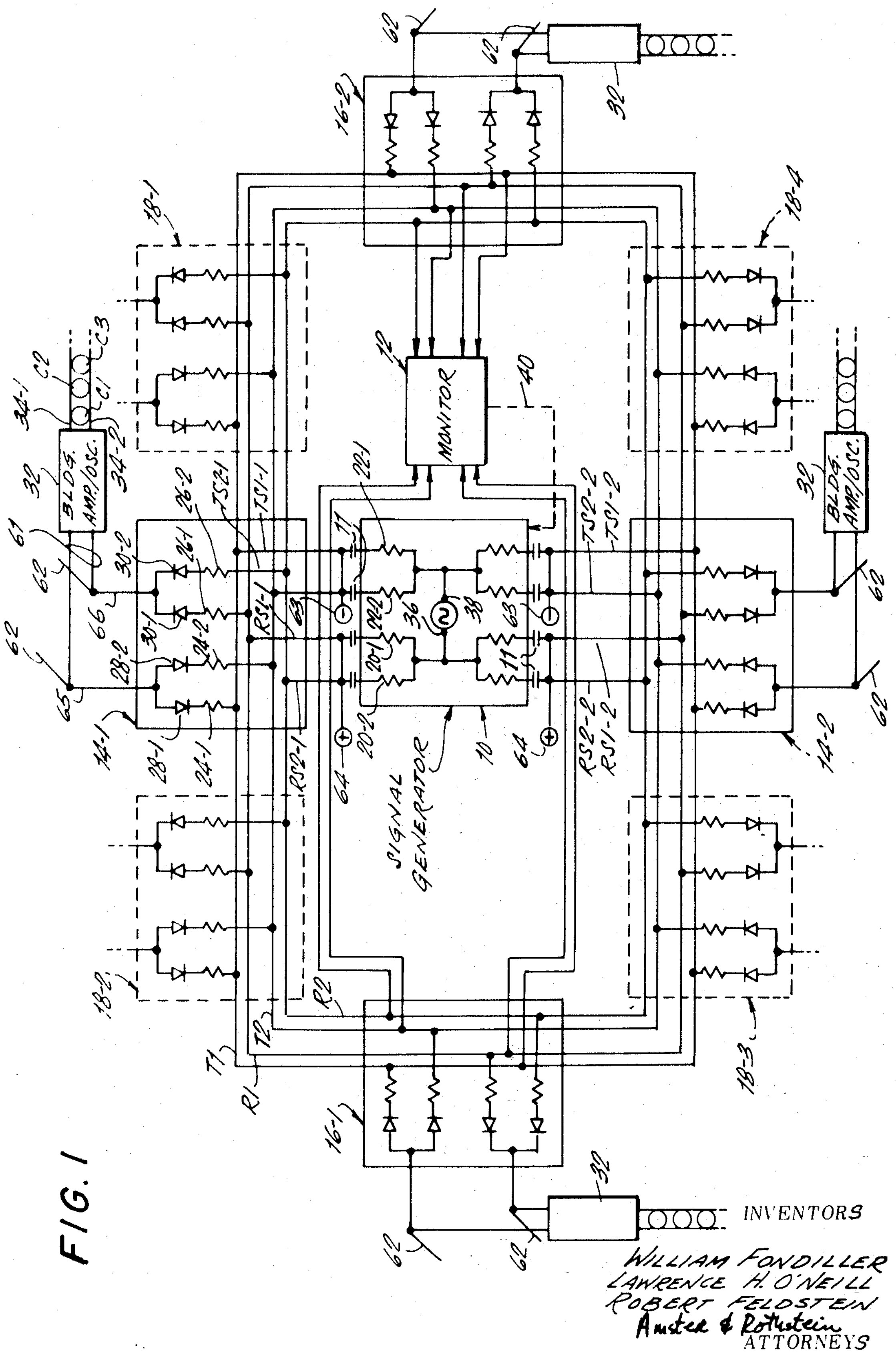
FIG. 1 depicts a first illustrative embodiment of the invention.
Figure 2:
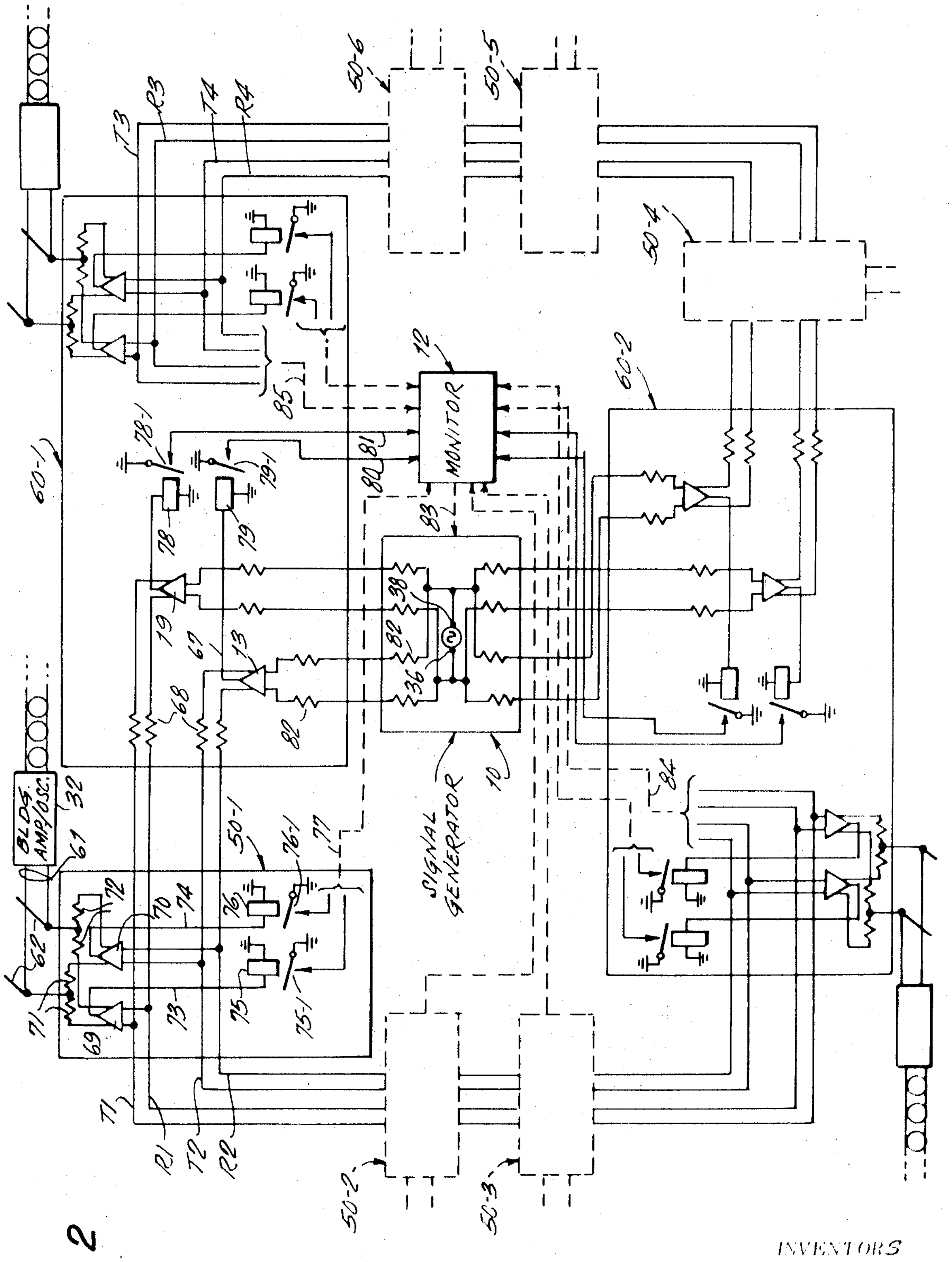
FIG. 2 depicts a second illustrative embodiment of the invention.
Figure 5:
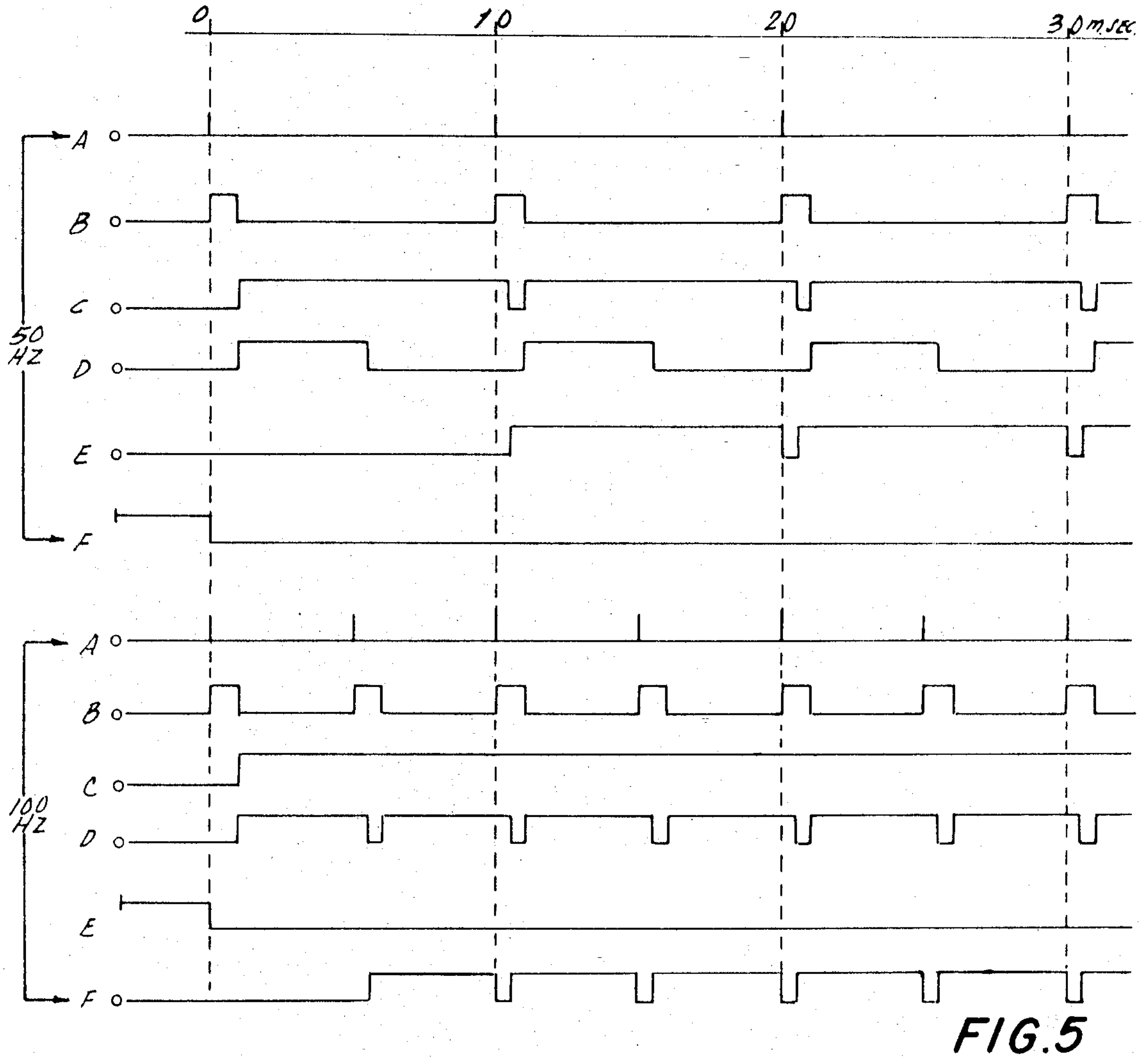
Figure 4:
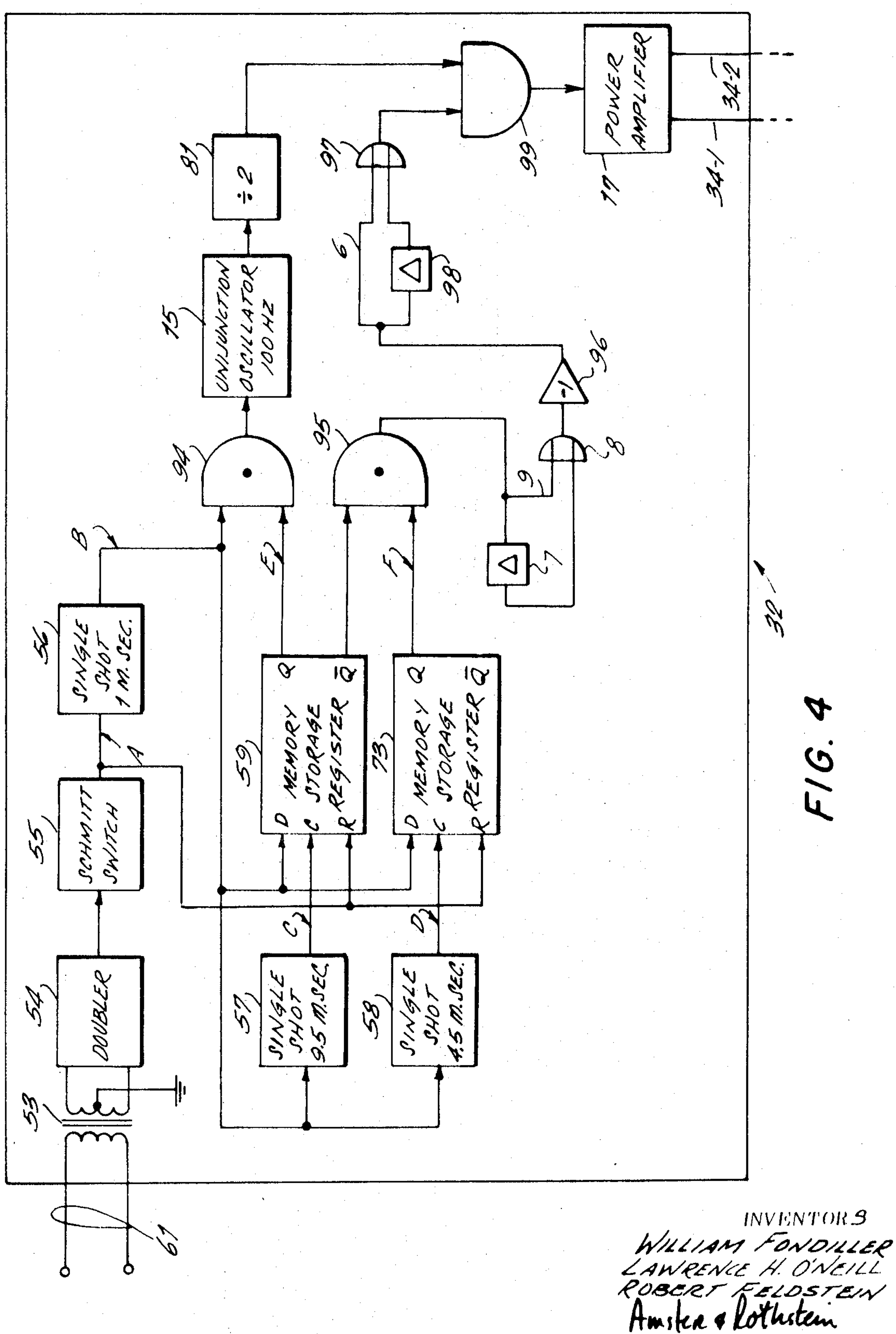

FIG. 4 depicts the circuitry included in signal generator 10 of FIGS. 1 and 2; and FIG. 5 is a timing diagram descriptive of the operation of each building amplifier/oscillator 32.

The system of FIG. 1 includes a signal generator 10, typically placed in a location central to the area served. The signal generator is coupled to two trunk circuits, or backbone loops, T1, R1 and T2, R2, which are extended through many central offices such as 14–1, 14–2, 16–1, 16–2, and 18–1 through 18–4. The central offices are not shown in detail except insofar as they establish connections from the trunk circuits to individual building amplifier/oscillators 32. Referring to central office 14–1, for example, the two output conductors 65, 66 are connected to a number of telephone lines in parallel, each serving a different building. One of these, line 61, is extended to unit 32 shown in the drawing. The other lines, all connected to respective ones of units 32 (not shown), are represented symbolically by the numeral 52. Central office 14–1, as well as each of the other central offices shown in the drawing, requires four resistors and four diodes for coupling all of the dedicated lines terminating at the office to the two backbone loops.

Signal generator 10 develops a 50-Hz. signal across terminals 36, 38. This signal is applied continuously during every 12-hour period, except for a brief interval during which a 100-Hz. signal is applied, as will be described below. The signal at terminal 36 is coupled through resistors 20–1 and 20–2 and two of capacitors 11, to conductors RS1–1 and RS2–1. These conductors are in turn connected in central office 14–1 to the two ring conductors R1 and R2. Source 64, connected as shown, establishes a positive DC potential on the two ring conductors. Similarly, terminal 38 is coupled through resistors 22–1 and 22–2, and two of capacitors 11, to conductors TS1–1 and TS2–1. These two conductors are in turn coupled to tip conductors T1 and T2. Sources 63 establishes a negative DC potential on the two tip conductors.

Similarly, at the bottom of signal generator 10, terminals 36 and 38 are connected to the two tip-ring pairs in a similar fashion. The double connection of the signal generator to each of the tip-ring pairs is to insure continuity of system operation in the event either of the connections from the signal generator to the master tip-ring loop pairs is broken.

It is also to insure continuity of system operation that two backbone loops are provided. Only one pair is required to couple the 50-Hz. and 100-Hz. signals to the central offices. However, two pairs are provided in order that signals still be transmitted to the building amplifiers in the event of a failure in one of the two pairs.

Referring to central office 14–1, the two tip conductors T1, T2 are coupled through respective resistors 24–1, 24–2 and diodes 28–1, 28–2 to conductors 65. Since the DC potential of the tip conductor is negative both diodes are forward biased. (The magnitudes of both DC potentials exceed the maximum AC potential.) Similarly, the two ring conductors R1, R2 are coupled through respective resistors 26–1, 26–2 and diodes 30–1, 30–2 to conductor 66. Since the two ring conductors are at a positive DC potential both diodes are forward biased. The 50-Hz. signals are transmitted over conductors 65, 66 and all of the telephone lines such as 61, 62 to the respective building amplifier/oscillators superimposed on the direct current flowing through the lines. In each building amplifier/oscillator, the 50-Hz. signals (but not the 100-Hz. signals) are extended to conductors 34–1, 34–2, across which are placed the plurality of driven clocks such as C1, C2 and C3.

In the event either of pairs T1, R1 or T2, R2 becomes short-circuited, the remaining operative tip-ring pair can still supply a signal to the building amplifier/oscillators without a significant reduction in amplitude. The DC component on conductors 65, 66 exceeds the peak value of the alternating signal through the conductors. Thus, the four diodes in central office 14–1 conduct. In the event one of the T1, R1 or T2, R2 pairs becomes short-circuited, the two associated diodes become reverse biased. For example, if conductors T1, R1 become short-circuited, the positive potential of conductor R2 is extended through resistor 26–2 and diode 30–2 to the cathode of diode 30–1. Similarly, the negative potential on conductor T2 is extended through resistor 24–2 and diode 28–2 to the anode of diode 28–1. Diodes 30–1 and 28–1 become reverse biased; the inoperative loop is isolated. Thus, a short-circuit in either backbone loop effectively isolates that loop from the remaining operative loop and the various subscriber lines.

In the event that two of the conductors such as 65, 66 become short circuited (thereby shorting all of lines 62 coupled to central office 14–1), the remainder of the system stays operative. The two tip conductors in the backbone loops are connected to the two ring conductors in the backbone loops through the four resistors in the central office containing the shorted line. Resistors 24–1, 24–2, 26–1 and 26–2 have relatively low impedances as compared with the input impedance of each building amplifier/oscillator. The signal level drops to almost half its normal value but no further, due to the inclusion of the four resistors in each of the central offices. The signal level is still high enough for detection by the building amplifier/oscillators.

The resistors in signal generator 10 are provided to prevent excessive current flow between the signal generator and the backbone loops in the event of a short-circuit in the backbone loops. All of the various safety features are designed to maintain continuity of service under adverse conditions.

At the two central offices 14–1, 14–2 signal generator 10 is coupled directly to the two backbone loops. All of the other central offices are connected to the central generator 10 via the two backbone loops which, through inter-office trunks, give ready access to the clocks in the area to be served. The two central offices 16–1, 16–2 are similar to the others in that they extend the 50-Hz. and 100-Hz. signals to subscriber lines. These two central offices, however, include further connections for coupling the four wires in the two backbone loops to monitor 12. Typically, the monitor can be contained in the same central station with signal generator 10. The monitor serves to verify that a sufficient signal level appears across each of the backbone loop pairs. Depending on the operation of monitor 12, signal generator 10 can be controlled, as shown symbolically by arrow 40, to raise the signal level when necessary. The details of the monitor circuit are not important for an understanding of the principles of the invention, and in those systems where monitors are incorporated the details of such circuits will be apparent to those skilled in the art.

The system of FIG. 2 is similar to that of FIG. 1 in its use of a telephone network for extending signals from a master central station over dedicated telephone lines to building amplifier/oscillators at various premises, but has different safety features, uses a different backbone loop configuration, and provides amplification for the individual subscriber lines.

The system of FIG. 2 is not provided with two continuous backbone loops. Instead, it is provided with four semi-loop pairs. Cable pairs T1, R1 and T2, R2 originate in central office 60–1, pass through central offices 50–1, 50–2 and 50–3, and terminate in central office 60–2. Cable pairs T3, R3 and T4, R4 originate in central office 60–2, pass through central offices 50–4, 50–5 and 50–6, and terminate in central office 60–1. Amplifier 13 in central office 60–1 connects terminals 36, 38 in signal generator 10 to conductor pair T2, R2. Various isolating resistors 68, 82 are provided as is known in the art. Similarly, amplifier 19 couples terminals 36, 38 to cable pair T1, R1. The amplifiers serve to maintain a sufficient signal magnitude on the lines, and permit the use of a low level signal generator output.

Monitor 12 is provided for determining that the signal magnitudes are at normal level. Amplifier 13 includes an output connected to conductor 67 whose signal strength is dependent upon the strength of the signal in cable pair T2, R2. If the signal strength is sufficient, the current in conductor 67, connected to the winding of relay 79, is sufficient to operate the relay. Contacts 79–1 remain open and no signal is transmitted over conductor 80 to monitor 12. However, if the signal strength decreases below the minimum acceptable value, relay 79 releases, contacts 79–1 close and a ground signal is transmitted over conductor 80 to monitor 12. This signal can cause either operation of a warning device or automatic adjustment of the strength of the signal generated as is known in the art. Relay 78, associated with amplifier 19, serves the same function with respect to cable pair T1, R1.

In central office 50–1, amplifier 69 is connected across cable pair T1, R1. Amplifier 70 is connected across cable pair T2, R2. The tip output of both amplifiers are coupled through resistors 71 to the tip conductors in all of the time service lines 61, 62 served by the central office. Similarly, the ring outputs of the two amplifiers are coupled through respective resistors 72 to the ring conductors in all of these lines. Amplifiers 69, 70 insure that a sufficient signal is provided to all of the building amplifier/oscillators. Each of the amplifiers includes an output conductor 73, 74 coupled to the winding of a respective relay 75, 76. If the outputs of both amplifiers are above the minimum value, contacts 75–1 and 76–1 are open and no signal is sent over cable 77 to the monitor. However, if either amplifier is not operating adequately, the associated relay releases and a signal is sent to the monitor.

As in the system of FIG. 1, two cable pairs are provided so that continuity of service is maintained even if one of the cable pairs malfunctions. In such a case, one of amplifiers 69, 70 no longer provides a signal to lines 61, 62. But the other amplifier continues to provide the time service signal as a result of isolation resistors 71 or 72.

Similar connections to dedicated subscriber lines are established in central offices 50–2, 50–3 and 60–2. It should be noted that in central office 60–2 the circuitry on the left side is the same as that in one of offices 50–1, 50–2 or 50–3, and simply serves to extend the time service signal to various dedicated lines. The circuitry on the right side of central office 60–2 is the same as that on the left side of central office 60–1 and serves to establish the time service signals on cable pairs T3, R3 and T4, R4.

The four conductors T1, R1, T2, R2 are returned through central office 60–2 over cable 84 to the monitor. The monitor is thus able to verify that the signal strength in each of the cable pairs is sufficient at its terminal point. Similarly, conductors T3, R3, T4, R4 are returned over cable 85 from central office 60–1 to the monitor.

The system of FIG. 2 has been illustrated simply to show the variety of schemes which can be employed. As with the system of FIG. 1, the system of FIG. 2 utilizes the telephone facility for extending continuous time service signals over dedicated channels to individual building amplifier/oscillators.

Figure 3:
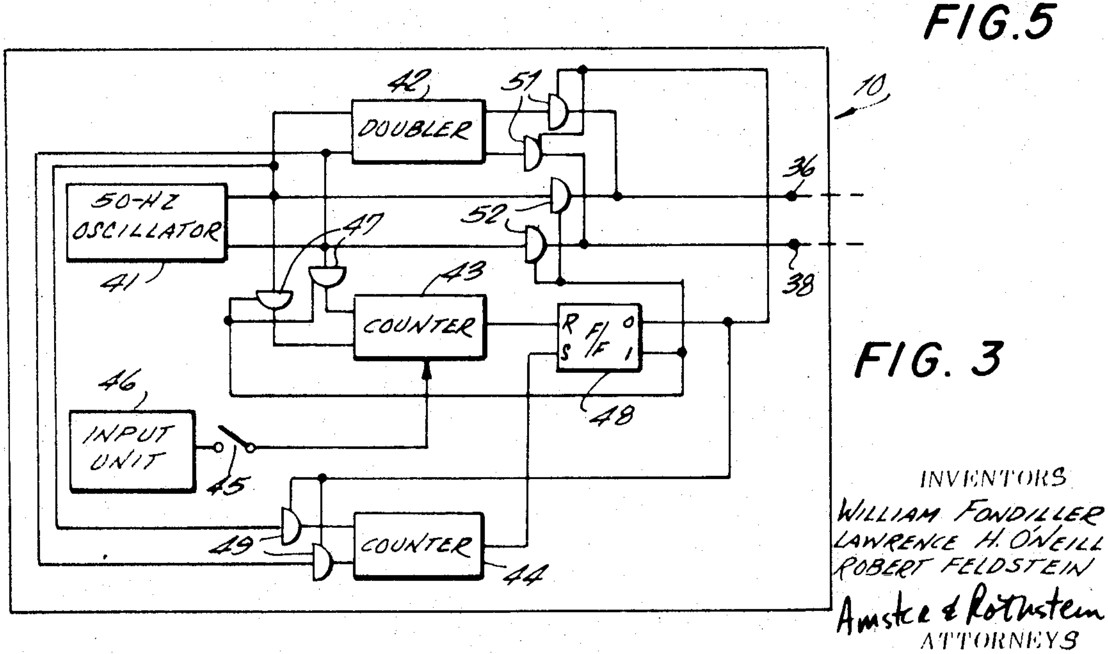
FIG. 3 depicts the circuitry included in each building amplifier/oscillator 32 of FIGS. 1 and 2.

FIG. 3 illustrates the circuitry of master frequency generator 10 which develops 50-Hz. and 100-Hz. signals across terminals 36, 38. The master frequency standard is 50-Hz. oscillator 41. This unit can be a commercially available highly accurate oscillator. (Typically, such an oscillator operates at a frequency higher than 50-Hz., but a 50-Hz. signal can be obtained with the use of a divider chain.) For assurance of extreme accuracy, the operation of the master generator can be checked periodically against time signals transmitted by the National Bureau of Standards.

Flip-flop 48 is normally in the 1 state with its 1 output energized. In such a case, both of gates 52 are enabled and the output signal from oscillator 41 is extended through these gates to terminals 36, 38 for transmission to the various building amplifier/oscillators 32. The 1 output of flip-flop 48 is also extended to the control terminals of gates 47. Both of these gates are thus normally enabled and the signal from oscillator 41 is transmitted to the input of counter 43. The counter counts the number of cycles of operation of the oscillator.

The counter, at the beginning of every 12-hour period, starts counting from an initial value of zero. When a predetermined count is reached, an overflow pulse is generated at the output of the counter for resetting flip-flop 48. At the same time, the counter automatically resets to its initial zero value. When flip-flop 48 switches to the 0 state, gates 47 and 52 cease operating, counter 43 remains in its initial state and 50-Hz. signals are no longer transmitted to terminals 36, 38.

With flip-flop 48 in the 0 state, gates 51 are enabled rather than gates 52. The output of oscillator 41 is extended to the input of frequency doubler 42, the doubler output thus being a 100-Hz. signal. Atlhough the doubler operates continuously, gates 51 are normally non-conducting. But when flip-flop 48 is in the 0 state and these gates are enabled for conduction, the doubler output is extended through gates 51 to terminals 36, 38. Thus, while the flip-flop is in the 0 state 100-Hz. signals are extended to the various building amplifier/oscillators.

With flip-flop 48 in the 0 state, gates 49 are enabled rather than gates 47. The output of oscillator 41 is extended through gates 49 to the input of counter 44. Counter 44 is similar to counter 43 in that it counts successive cycles of operation of oscillator 41. Initially, when flip-flop 48 first switches to the 0 state, counter 44 contains an initial count of zero. After it has counted a predetermined number of cycles, an overflow pulse is generated and the counter resets to an initial count of zero. The overflow pulse is extended to the set input of flip-flop 48 which is thus switched back to its 1 state, at which time counter 43 resumes operation and 50-Hz. signals are again transmitted throughout the system.

In any 12-hour period there are 43,200 seconds. In any 12-hour period oscillator 41 generates 50, (43,200) or 2,160,000 repetitive signals. Counter 43 normally has a maximum count of 2,159,750. It thus takes the counter exactly 5 seconds less than 12 hours to go from its initial reset condition, through a full count, and back to the initial condition with the generation of an overflow pulse.

Counter 44 has a maximum count of 250, that is, it requires exactly 5 seconds for the counter to go from its initial reset condition, through a full count, and back to the reset condition with the generation of an overflow pulse. It is thus apparent that counter 43 operates and flip-flop 48 is in the 1 state for 11 hours, 59 minutes and 55 seconds during each 12-hour period. Counter 44 operates and flip-flop 48 is in the 0 state for the remaining 5 seconds in every 12-hour period. Thus, 50-Hz. signals are transmitted continuously throughout the system during every 12-hour period, except for a 5-second interval during which 100-Hz. signals take their place.

Any convenient synchronizing time can be selected. For illustrative purposes it can be assumed that all of the clocks, which automatically reset to a predetermined position when 50-Hz. signals are no longer delivered to them, reset to the 2:00:00 position. In such a case, signal generator 10 is first put into operation such that counter 43 is made to complete each cycle of its operation and to generate an overflow pulse at 1:59:55. At exactly 5 seconds before 2:00, 50-Hz. signal transmission ceases and 100-Hz. signal transmission begins. During the next 5 seconds all of the clocks reset to 2:00:00. Although the clocks reset quickly, they remain at the 2:00:00 position since the respective building amplifier/oscillators do not extend signals to them. At precisely 2:00, signal generator 10 resumes 50-Hz. signal transmission, since it is at 2:00 that counter 44 sets flip-flop 48 in the 1 state. At this precise time, driving of all clocks begins once again.

Twice each year it is necessary to reset all of the clocks by advancing them or turning them back by one hour.

This is easily accomplished with the use of input unit 46 and switch 45 in FIG. 3. Although counter 43 normally counts up to 2,159,750 before an overflow pulse is generated, the maximum count can be set externally from input unit 46. Input unit 46 controls counter 43 to change its maximum count by 180,000 in either direction. In any one-hour period there are 3,600 seconds, and oscillator 41 oscillates 180,000 times. If the maximum count of counter 43 is increased from 2,159,750 to 2,339,750, it requires 13 hours, less 5 seconds, for the counter to cycle. On the other hand, if the maximum count of the counter is set at 1,979,750, it requires 11 hours, less 5 seconds, for the counter to cycle.

Twelve hours before it is necessary to retard or advance all clocks, during the 5-second interval when counter 44 is operating and counter 43 is inoperative, switch 45 is momentarily operated. Prior to this time input unit 46 has been adjusted to feed into counter 43 either the maximum or minimum count magnitude. With the operation of switch 45, counter 43 is adjusted to count for either one hour longer or one hour less. To advance all clocks, counter 43 is adjusted to a maximum count of 1,979,750. Elven hours later (less 5 seconds), when counter 43 has completed its next cycle of operation, all of the clocks will jump from 12:59:55 to 2:00:00. On the other hand, when it is necessary to retard the clocks by one hour, counter 43 is adjusted to have a maximum count of 2,339,750. Thirteen hours later (less 5 seconds), when counter 43 has completed its next cycle, all of the clocks which will then show a time of 2:59:55 will jump black to 2:00:00.

In either case, during the 5-second interval that counter 43 is not operating, input unit 46 and switch 45 can be operated to set the maximum count of counter 43 to its normal value, 2,160,000.

In the example selected, all of the clocks automatically reset to 2:00:00 which is the time of day when changes are made twice each year to and from daylight saving time. Suppose, however, that the clocks are so adjusted that they automatically reset to some other arbitrary position, e.g., 4:00:00. Changes to and from daylight saving time could only take place at this time since this is the resettable position of the clocks. In this system, the original set-up would be such that counter 43 resets flip-flop 48 at 3:59:55. It would still be possible to advance or turn back the clocks by one hour with the same operation of switch 45 and input unit 46—except that now the change to and from daylight saving time would take place two hours after it should take place. It is for this reason that the clocks used in the system have a preferred resettable time close to 2:00:00. The precise time of 2:00 for synchronization may not be the best possible choice because it is often necessary for users of the time service system to have accurate hourly signals. Accordingly, it has been found preferable to select a synchronizing time (resettable clock position) of slightly after 2:00:00. This not only insures that the individual clocks always provide accurate hourly signals, but also minimizes the difference between the time when the changeover to and from daylight saving time should take place and the time it actually takes place insofar as the clocks are concerned.

An individual building amplifier/oscillator 32 is shown in FIG. 4. The input to the unit is line 61 from a telephone central office. The output of the unit (50-Hz. signals except during the synchronizing period) appears on conductors 34–1, 34–2 extended to all of the clocks to be controlled in the building. (In the case of many clocks in the same building, for sufficient drive power it may be necessary to employ two or more amplifier/oscillators coupled to the same building pair.)

In the example considered above, 50-Hz. signals are transmitted throughout the system from 2:00:00 through 1:59:55, 100-Hz. signals being transmitted during the remaining 5 seconds of every 12-hour period. The clocks themselves require considerably less than 5 seconds to reset. The clocks, however, do not actually start resetting at precisely 1:59:55 when the changeover from 50-Hz. to 100-Hz. signal transmission takes place. This is for safety reasons. In an ideal system the 50-Hz. signal will be transmitted with no interruptions for 12 hours, less 5 seconds. But it is recognized that momentary interruptions due to external factors such as electrical interference may take place. Were the clocks to synchronize automatically the instant that the 50-Hz. signal is interrupted, the system operation might be subject to false synchronization.

For this reason, a double safeguard is provided. First, the cessation of 59-Hz. signal transmission is not in and of itself sufficient for controlling clock synchronization. Instead, in addition to the absence of a 50-Hz. signal, for the clocks to reset it is necessary that a 100-Hz. signal appear on the line. Second, before the clocks reset the 50-Hz. signal must have been absent and the 100-Hz. signal must have been present for at least a continuous interval of .25 second.

But it must also be borne in mind that if the clocks are not to be reset, they should be driven in order to continue their advance. During the first .25-second interval at each switch-over, the clocks must be driven in order that they not have slowed down in the event the switch-over is proven to be false. Also, in the event of a serious failure, such as the short-circuiting of the line to the building amplifier/oscillator, the clocks should still be driven.

Accordingly, each of clock controllers 32 is provided with a local oscillator for driving the clocks. This local oscillator is phase-locked by the incoming 50-Hz. signal so that the clocks are driven in synchronism with the signal. The oscillator, under ordinary circumstances, is not allowed to run freely. However, it runs freely in two situations. When a true switchover takes place, even though 100-Hz. signals are received immediately, 50-Hz. signals are still sent to the clocks for .25 second. Since there is no 50-Hz. signal on line 61 at this time, the only available signal is from the oscillator which is allowed to operate on its own at this time. The second situation is that in which neither of the 50-Hz. or the 100-Hz. signals are received. In such case, since the 100-Hz. synchronizing signal is absent, the clocks continue to be driven by the free-running local oscillator. The building amplifier/oscillator is constructed such that the local oscillator is always phased-locked to the 50-Hz. signal on the telephone line when such a signal is present, runs freely to control the clocks when synchronization begins until the 100-Hz. signal has been received for .25 second, and ceases transmission to the clocks (although it continues to run freely) when a 100-Hz. signal has been received and continues to be received after .25 second.

Referring to FIG. 4, the input signal on line 61 is extended through transformer 53, the center tap of whose secondary winding is grounded, to doubler 54. The doubler, which thus operates at twice the line frequency, feeds a 100-Hz. or 200-Hz. signal to Schmitt switch 55. The output of the Schmitt switch in turn resets the two memory storage registers 59, 73 and triggers single-shot multivibrator 56, whose period of unstable operation is 1 millisecond. The output waveform A of Schmitt switch 55 is shown in FIG. 5. Similar remarks apply to waveforms B–F. FIG. 5, which shows the waveforms for both 50-Hz. and 100-Hz. signal transmission, will be considered below. The various waveforms of FIG. 5 will be helpful in understanding the operation of single-shot multivibrators 56, 57 and 58, and registers 59 and 73. These various units serve the following function: When 50-Hz. signals are being received, AND gate 94 transmits pulses to unijunction oscillator 15 at a 100 per second rate, while the output of AND gate 95 is continuously low. When 100-Hz. signals are received over line 61, the output of gate 94 is continuously low and the output of gate 95 is high (except for very short periods which have no effect on the circuit operation as will be described below). If neither signal is received, the outputs of both gates are continuously low. With this operation in mind the circuitry on the right side of FIG. 4 can be understood.

During 50-Hz. signal transmission, each pulse from AND gate 94 phase-locks oscillator 15 so that the oscillator delivers pulses at a rate of 100 per second to divider 81, the pulses being in synchronism with the incoming signal, two oscillator pulses during each cycle of the 50-Hz. signal. Divider 81, in turn, delivers pulses at a 50 per second rate to one input of AND gate 99. The output of gate 95 is low, no signal is sent over conductor 9 or through delay unit 7 to OR gate 8, and thus the output of inverter 96 is high. This signal is transmitted directly over conductor 6 to one input of OR gate 97 and through delay unit 98 to the other input of the OR gate. The energized output of the OR gate continuously energizes the other input of AND gate 99. Consequently, pulses are transmitted through the gate to power amplifier 17 at a rate of 50 per second. The power amplifier applies a signal to conductors 34–1, 34–2, preferably a square wave signal, sufficient in amplitude to drive all of the connected clocks, each of the clocks advancing one second for every 50 cycles of the signal delivered by the power amplifier.

At 1:59:55 the switch-over to 100-Hz. transmission takes place. At this time the output of gate 94 goes low and the output of gate 95 goes high (except for periodic .5-millisecond intervals which will be described below). Phase-locking pulses are no longer delivered to oscillator 15, which now runs freely to deliver pulses at a 50 per second rate to one input of gate 99. The output of gate 95 is high except for .5 millisecond during each 5-millisecond interval. Unit 7 provides a delay of 1 millisecond. OR gate 8 is energized continuously over conductor 9 except for the periodic .5-millisecond intervals. But during these intervals a signal is still coming through delay unit 7 so OR gate 8 remains energized continuously. With the input to inverter 96 high, its output is low and thus OR gate 97 is not energized over conductor 6. However, unit 98 has a delay of .25 second and consequently OR gate 97 is still energized for .25 second since prior to the switch-over the output of inverter 96 was high. Thus, AND gate 99 continues to operate for this interval with the 50 per second pulses delivered to the power amplifier arising from the free-running operation of oscillator 15. The clocks still run during this short period. At the end of .25 second, delay unit 98 no longer energizes an input of OR gate 97, gate 99 turns off, power amplifier 17 no longer drives the clocks and the clocks reset.

In the event the 100-Hz. signal ceases before .25 second has elapsed, and the 50-Hz. signal resumes, after the delayed signal through unit 7 terminates 1 millisecond later inverter 96 immediately energizes conductor 6. Gate 99 remains energized and thus the clocks do not reset.

If the 50-Hz. signal ceases for any reason other than synchronization, e.g., a line failure, oscillator 15 continues to drive the clocks at its own pace which, while it may not be as accurate as the 50-Hz. signal from signal generator 10, prevents false resetting or stopping of the clocks.

At the end of any synchronizing period, the output of gate 95 immediately goes low. The output of inverter 96 goes high 1 millisecond later (an insignificant delay) and since it is coupled to OR gate 97 directly over conductor 6 the clocks start running under control of oscillator 15 which is phase-locked to the incoming 50-Hz. signal. It is thus seen that with normal operation, at 1:59:55 the clocks are no longer driven in synchronism with the 50-Hz. oscillator in signal generator 10. However, they continue to be driven by free-running oscillator 15 for .25 second. At 1:59:55.25, power amplifier 17 ceases to extend a signal to the clocks and they all reset to 2:00:00, the resetting taking place in considerably less than 4.75 seconds. The clocks, after they reset, are not immediately driven. They remain at 2:00:00 position until exactly 2:00 at which time they are once again driven in synchronism with the incoming 50-Hz. signal.

The three single shot multivibrators on FIG. 4 normally provide low-level outputs until they are triggered. Following the triggering of any one of the multivibrators the output goes high for the respective unstable period (1 millisecond, 9.5 milliseconds or 4.5 milliseconds) after which the output goes low once again. The two memory storage registers are flip-flops with the property that the logic level appearing at the D input is transferred to the Q output whenever a negative clock step appears at the C input. Once set, the register remains in the same state until the next clock input at which time the logic level at the respective D input is transferred to the respective Q output. The $\overline{Q}$ output of each register is always the opposite of the respective Q output. The $\overline{Q}$ output of register 73 is not used in the circuit. In addition, a pulse applied to the R input of either register turns the Q output low.

Referring to the upper waveforms in FIG. 5 which are generated during 50-Hz. transmission, Schmitt switch 55 operates at a 100 per second rate, and thus its output waveform A contains a sharply defined pulse every 10 milliseconds. Following each of these pulses, multivibrator 56 provides a 1-millisecond pulse in its waveform B. This pulse is extended to the input of each of multivibrators 57 and 58, but these multivibrators are triggered only at the termination of each pulse in waveform B. Accordingly, at the end of each 1-millisecond pulse in waveform B, multivibrator 57 turns on for 9.5 milliseconds. As is evident from waveform C in FIG. 5, the output of multivibrator 57 does not go low once again until the middle of the next pulse in waveforb B. As for the output of multivibrator 58, it goes high together with the output of multivibrator 57, but goes low before the next pulse in waveform B.

The output of multivibrator 57 is coupled to the clock input of register 59. In order for the register to change state, the clock signal must be a negative going step. Referring to FIG. 5, it is seen that in the middle of the second pulse in waveform B, the clock input goes negative. Consequently, assuming that the Q output of the register was originally low (which it is during 100-Hz. transmission), it now goes high. The next pulse from the Schmitt switch resets register 59 and waveform E goes low. But .5 millisecond later the clock input to register 59 once again goes negative. At this time waveform B is still positive so the Q output of the register goes high. As shown in waveform E, as long as 50-Hz. signals are received the output of register 59, coupled to one input of gate 94, is high for the last half of every pulse in waveform B. Thus, the last half of each pulse at the output of multivibrator 56 is transmitted through gate 94 to phase-lock oscillator 15. Of course, as seen in FIG. 5, there is a 10-millisecond delay before waveform E goes high after 50-Hz. signal transmission begins, but this delay is insignificant.

As for register 73, its clock input, waveform D, does not take a negative step each time the D input (waveform B) is pulsed by multivibrator 56. The first A pulse turns the Q output low, and it remains low. The other input to gate 95 is coupled to the $\overline{Q}$ output of register 59 which is also low during 50-Hz. signal transmission. Thus, gate 95 remains off and gate 99 transmits all oscillator pulses to the power amplifier.

During 100-Hz. tranmission, the pulses in waveform A occur at 5-millisecond intervals. Similar remarks apply to the pulses in the B waveform. Since multivibrator 57 has a longer period than the intervals between the pulses in waveform B, the multivibrator never times out. With the negative step in the first pulse in waveform B, the output of the multivibrator goes high and it remains high. Since register 59 cannot be switched by a signal at its D input unless a negative step is applied to its C input, the B waveform has no effect on the register. The first pulse in waveform A resets register 59 so that its Q output goes low, and it remains low for the duration of the synchronizing period. Waveform E which is high during 50-Hz. transmission (except for .5 millisecond during each 10-millisecond cycle) goes low during 100-Hz. transmission with the first pulse in waveform A and remains low. Gate 94 turns off and oscillator 15 runs freely. However, as described above, gate 99 is enabled for only the first .25 second of the synchronizing period. Thereafter, the gate turns off and the oscillator pulses are not extended to the power amplifier.

Multivibrator 58 is triggered at the end of each pulse in the B waveform. The output of the multivibrator goes high for 4.5 milliseconds. Referring to the lower waveforms B and D in FIG. 5, it is apparent that waveform D goes negative, i.e., a clock pulse is applied to register 73, in the middle of each pulse in waveform B. Consequently the Q output of register 73 goes high each time the output of multivibrator 58 goes low, as shown in waveform F.

However, each pulse in waveform A resets register 73 so that its Q output goes low. Consequently, waveform F is high except for .5-millisecond intervals which occur periodically every five milliseconds. During the 5-second synchronizing period the input to inverter 96 must remain high. The input of gate 95 connected to the $\overline{Q}$ output of register 59 is held high continuously. Waveform F, however, goes low periodically as seen in FIG. 5. Consequently, gate 95 is de-energized for .5 millisecond every 5 milliseconds. To prevent the input of inverter 96 from going low at this time, delay unit 7 and OR gate 8 are provided as discussed above.

Although the invention has been described with reference to particular embodiments, it is to be understood that these embodiments are merely illustrative of the application of the principles of the invention. For example, the building amplifier/oscillator of FIG. 4 is only one of many which can be used. Many alternative designs will be apparent to those skilled in the art for differentiating between 50-Hz. and 100-Hz. signals, and for powering the clocks only when 50-Hz. signals are received. It is also possible to use other types of signals for controlling the running of the clocks, with an appropriate discontinuity for controlling their resetting. Thus, it is to be understood that numerous modifications may be made in the illustrative embodiments of the invention and other arrangements may be devised without departing from the spirit and scope of the invention.

What is claimed is:

1. A time service system comprising a central station; a plurality of clock controllers; a plurality of clocks drivable by each of said clock controllers; each of said clocks being automatically synchronizable in substantially less time than one minute to a predetermined time position independent of the initial time position of the clock; means in said central station for continuously transmitting a first signal to all of said clock controllers; means in said central station for transmitting a second signal to all of said clock controllers; each of said clock controllers including means for recognizing said first signal and in response thereto for driving said clocks, and for recognizing said second signal and in response thereto for enabling said clocks to synchronize automatically; means for controlling the transmission of said second signal instead of said first signal to said clock controllers at a time of day shortly before that represented by said predetermined time position; and means for controlling the resumption of transmission of said first signal instead of said second signal at the time of day represented by said predetermined time position.

2. A time service system in accordance with claim 1 wherein said means for transmitting said first and second signals to each of said clock controllers includes a public telecommunications facility.

3. A time service system in accordance with claim 2 wherein said public telecommunications facility is a telephone network.

4. A time service system in accordance with claim 3 further including a dedicated line connected between each of said clock controllers and said first and second signal transmitting means.

5. A time service system in accordance with claim 1 wherein said first and second signals are transmitted to said plurality of clock controllers via a dedicated channel of a public telecommunications facility.

6. A time service system in accordance with claim 1 wherein each of said clock controllers includes an oscillator for controlling the driving of said clocks in accordance with the frequency of said oscillator in the event neither of said first and second signals is transmitted to said clock controller.

7. A time service system in accordance with claim 6 wherein the frequency of said oscillator is the same as the frequency of said first signal, and each of said clock controllers includes means for locking said oscillator to the phase of said first signal.

8. A time service system in accordance with claim 5 wherein each of said clock controllers includes an oscillator for controlling the driving of said clocks in accordance with the frequency of said oscillator in the event neither of said first and second signals is transmitted to said clock controller.

9. A time service system in accordance with claim 8 wherein the frequency of said oscillator is the same as the frequency of said first signal, and each of said clock controllers includes means for locking said oscillator to the phase of said first signal.

10. A time service system in accordance with claim 1 further including means in said central station for controlling the switchover from said first signal transmission to said second signal transmission to be advanced or retarded by one hour, twice each year, for controlling said clocks to display changes to and from daylight saving time.

11. A time service system in accordance with claim 5 further including means in said central station for controlling the switchover from said first signal transmission to said second signal transmission to be advanced or retarded by one hour, twice each year, for controlling said clocks to display changes to and from daylight saving time.

12. A time service system in accordance with claim 1 further including means for preventing each of said clock controllers from ceasing to drive said clocks until after said second signal has replaced said first signal for a predetermined time interval.

13. A time service system in accordance with claim 5 further including means for preventing each of said clock controllers from ceasing to drive said clocks until after said second signal has replaced said first signal for a predetermined time interval.

14. A time service system comprising a central station, a plurality of clock controllers at different premises, a plurality of clocks associated with and controlled by each of said clock controllers, means in said central station for continuously transmitting an operating signal to all of said clock controllers for enabling them to control the running of the associated pluralities of clocks, said clock controllers including means responsive to the interruption of the transmission of said operating signal for controlling the resetting of all of the associated pluralities of clocks in substantially less time than one minute independent of the initial positions of said clocks, and means for interrupting the transmission of said operating signal and thereafter for resuming the transmission of said operating signal such that with the resumption of the transmission of said operating signal all of said clocks are synchronized to the correct time of day, the time period during which said operating signal is interrupted being a negligible fraction of each time period during which said operating signal is transmitted without interruption.

15. A time service system in accordance with claim 14 wherein said operating signal is transmitted to said clock controllers via a dedicated channel of a public telecommunications facility.

16. A time service system in accordance with claim 15 further including means for enabling the interruption of the transmission of said operating signal to be advanced or retarded selectively to adjust the time displayed by said clocks.

17. A time service system in accordance with claim 14 further including means for enabling the interruption of the transmission of said operating signal to be advanced or retarded selectively to adjust the time displayed by said clocks.

18. A time service system in accordance with claim 14 wherein each of said clocks includes means for automatically resetting to a predetermined time position, and the transmission of said operating signal resumes at the time of day represented by the reset position of the clocks.

19. A time service system in accordance with claim 16 wherein each of said clocks includes means for automatically resetting to a predetermined time position, and the transmission of said operating signal resumes at the time of day represented by the reset position of the clocks.

20. A time service system in accordance with claim 14 further including means for transmitting a synchronizing signal to all of said clock controllers during those time intervals when said operating signal is not transmitted, means in each of said clock controllers responsive to the transmission of neither of said operating and synchronizing signals for directly controlling the running of the associated clocks, and means in each of said clock controllers for detecting the absence of said operating signal and the presence of said synchronizing signal for controlling the resetting of all of the associated clocks.

21. A time service system in accordance with claim 16 further including means for transmitting a synchronizing signal to all of said clock controllers during those time intervals when said operating signal is not transmitted, means in each of said clock controllers responsive to the transmission of neither of said operating and synchronizing signals for directly controlling the running of the associated clocks, and means in each of said clock controllers for detecting the absence of said operating signal and the presence of said synchronizing signal for controlling the resetting of all of the associated clocks.

22. A time service system in accordance with claim 19 further including means for transmitting a synchronizing signal to all of said clock controllers during those time intervals when said operating signal is not transmitted, means in each of said clock controllers responsive to the transmission of neither of said operating and synchronizing signals for directly controlling the running of the associated clocks, and means in each of said clock controllers for detecting the absence of said operating signal and the presence of said synchronizing signal for controlling the resetting of all of the associated clocks.

23. A time service system in accordance with claim 14 wherein the time period during which said operating signal is transmitted without interruption is in the order of hours and the time period during which said operating signal is interrupted is in the order of seconds.

24. A time service system in accordance with claim 16 wherein the time period during which said operating signal is transmitted without interruption is in the order of hours and the time period during which said operating signal is interrupted is in the order of seconds.

25. A time service system in accordance with claim 20 wherein the time period during which said operating signal is transmitted without interruption is in the order of hours and the time period during which said operating signal is interrupted is in the order of seconds.

26. A time service system in accordance with claim 20 further including means in each of said clock controllers for delaying the resetting of all of the associated plurality of clocks until said synchronizing signal has been transmitted to the exclusion of said operating signal for a predetermined time interval.

27. A time service system in accordance with claim 26 wherein said operating signal is transmitted without interruption for a time period in the order of hours, said synchronizing signal is transmitted for a time period in the order of seconds, and said predetermined time interval is a fraction of the time period during which said synchronizing signal is transmitted.

28. A time service system in accordance with claim 14 wherein the interruption of the transmission of said operating signal occurs at 12-hour intervals.

29. A time service system in accordance with claim 20 wherein the periodic transmission of said synchronizing signal occurs at 12-hour intervals.

30. A time service system in accordance with claim 27 wherein the periodic transmission of said synchronizing signal occurs at 12-hour intervals.

31. A time service system comprising means at a central location for generating a continuous periodic signal, means for transmitting said continuous periodic signal to a plurality of remote locations, means for producing a discontinuity in said continuous periodic signal at a fixed time in an established framework of time, a plurality of clocks at said remote locations, each of said clocks being adapted to continuously advance in response to the receipt of said continuous periodic signal and being operative to reset to a predetermined time indication in the established framework of time responsive to a discontinuity in said continuous periodic signal, and means for selectively changing the producing of said discontinuity from said fixed time to another time in said established framework of time to control the resetting of said clocks to said predetermined time indication at times other than said fixed time.

32. A time service system in accordance with claim 31 wherein said continuous periodic signal is transmitted to the remotely located clocks via a dedicated channel of a public telecommunications facility.

33. A time service system in accordance with claim 31 wherein said changing means is operative to advance or delay said discontinuity in said continuous periodic signal from said fixed time by one hour.

34. A time service system in accordance with claim 32 wherein said changing means is operative to advance or delay said discontinuity in said continuous periodic signal from said fixed time by one hour.

35. A time service system in accordance with claim 31 further including means at said central location for terminating said discontinuity in said continuous periodic signal at a time in said established framework of time corresponding to said predetermined time indication of said clocks in their reset conditions.

36. A time service system in accordance with claim 34 further including means at said central location for terminating said discontinuity in said continuous periodic signal at a time in said established framework of time corresponding to said predetermined time indication of said clocks in their reset conditions.

37. A time service system in accordance with claim 31 wherein the time period during which said continuous periodic signal is transmitted without the occurrence of said discontinuity is in the order of hours and the duration of said discontinuity is in the order of seconds.

38. A time service system in accordance with claim 35 wherein the time period during which said continuous periodic signal is transmitted without the occurrence of said discontinuity is in the order of hours and the duration of said discontinuity is in the order of seconds.

39. A time service system in accordance with claim 36 wherein the time period during which said continuous periodic signal is transmitted without the occurrence of said discontinuity is in the order of hours and the duration of said discontinuity is in the order of seconds.

40. A time service system in accordance with claim 31 wherein said discontinuity occurs at multiples of twelve hours.

41. A time service system in accordance with claim 36 wherein said discontinuity occurs at multiples of twelve hours.

42. A time service system in accordance with claim 39 wherein said discontinuity occurs at multiples of twelve hours.

References Cited

UNITED STATES PATENTS 3,137,121 6/1964 Tringali -------------- 58—24

FOREIGN PATENTS 1,545,456 11/1968 France --------------- 58—24

RICHARD B. WILKINSON, Primary Examiner

E. C. SIMMONS, Assistant Examiner

U.S. Cl. X.R.

58—35 R